Figure 1:
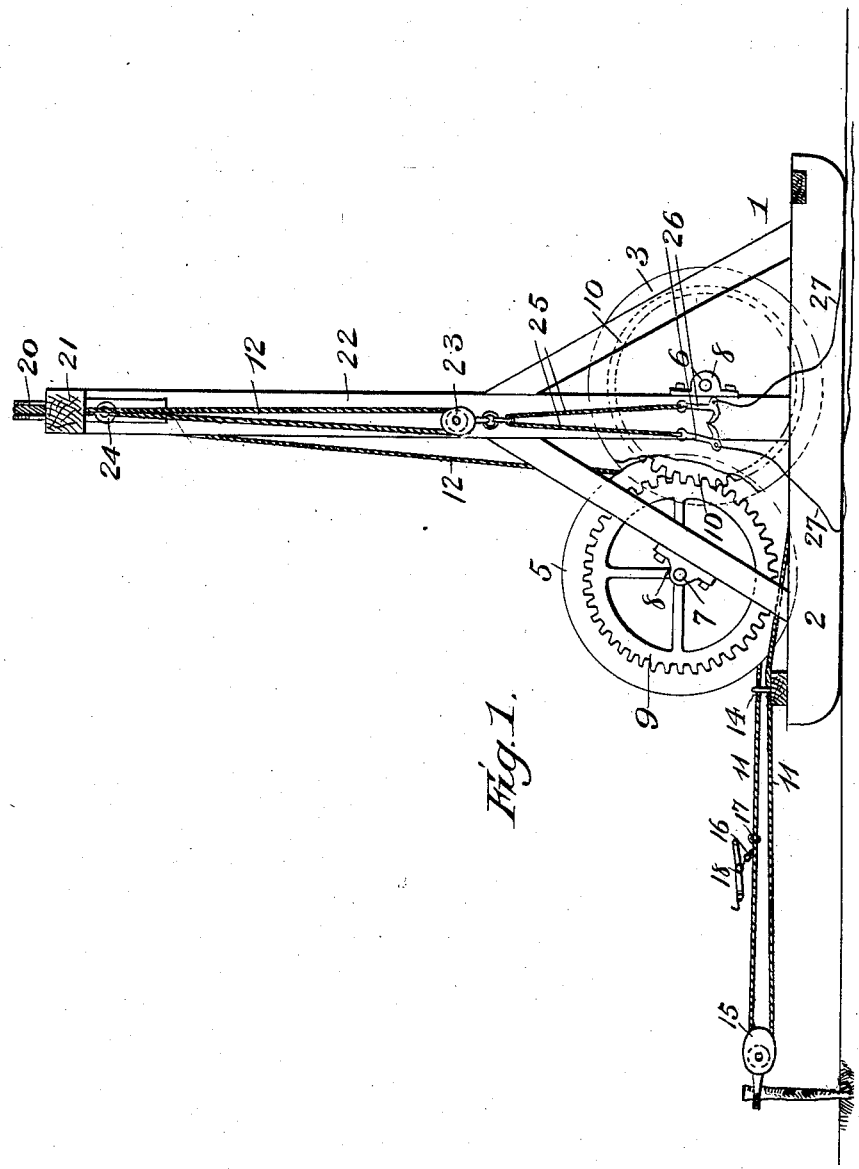

No. 888,583. PATENTED MAY 26, 1908.
J. R. BUCKLEY & G. A. HUGGINS.
LOG LOADING MACHINE.
APPLICATION FILED MAR. 9, 1907.

4 SHEETS—SHEET 1.

Witnesses:
Inventors:
John R. Buckley.
George A. Huggins,
By
Attorneys

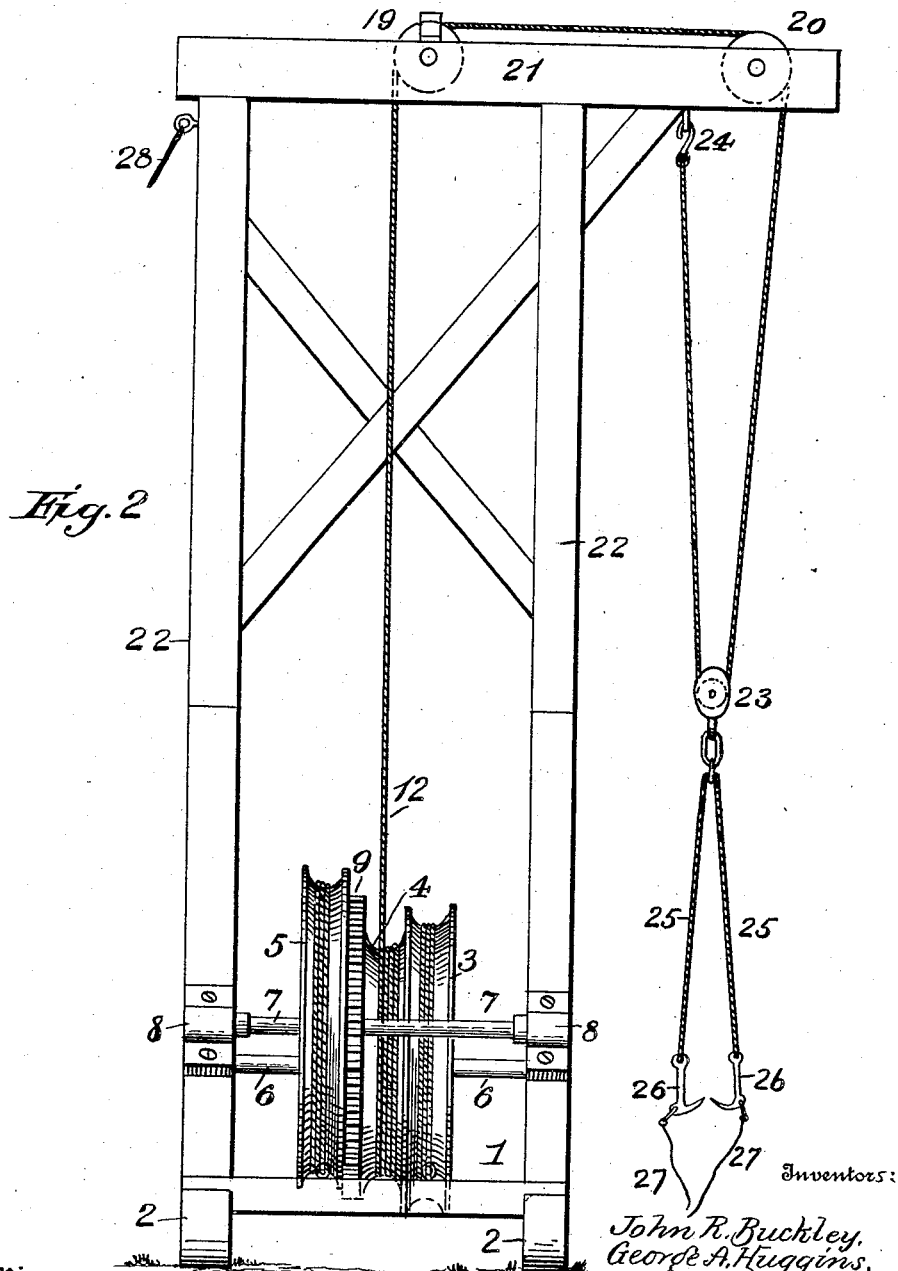

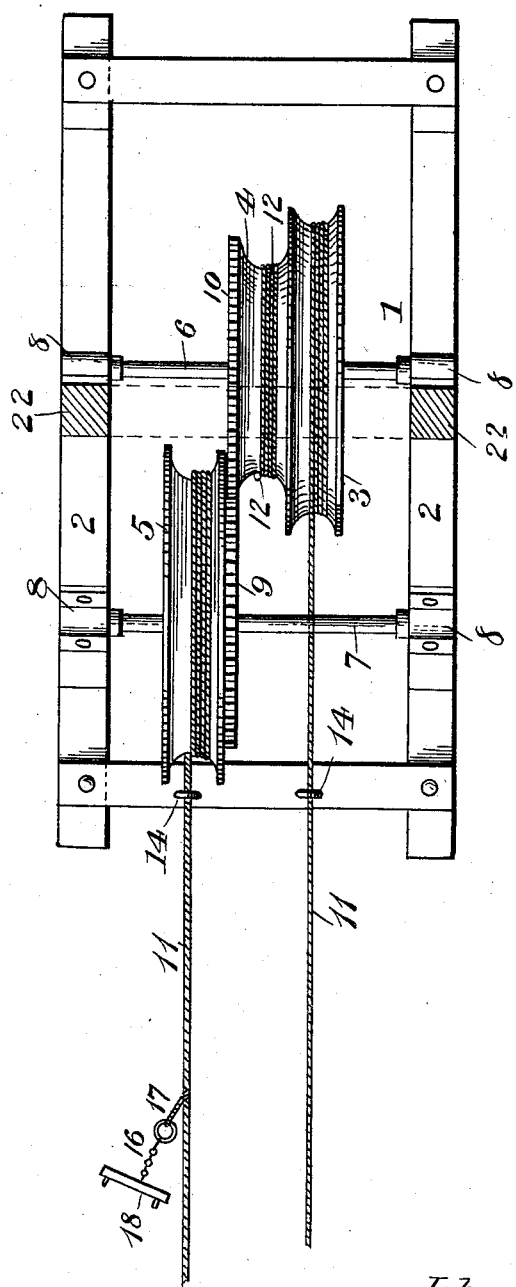

No. 888,583. PATENTED MAY 26, 1908.
J. R. BUCKLEY & G. A. HUGGINS.
LOG LOADING MACHINE.
APPLICATION FILED MAR. 9, 1907.
4 SHEETS—SHEET 4.
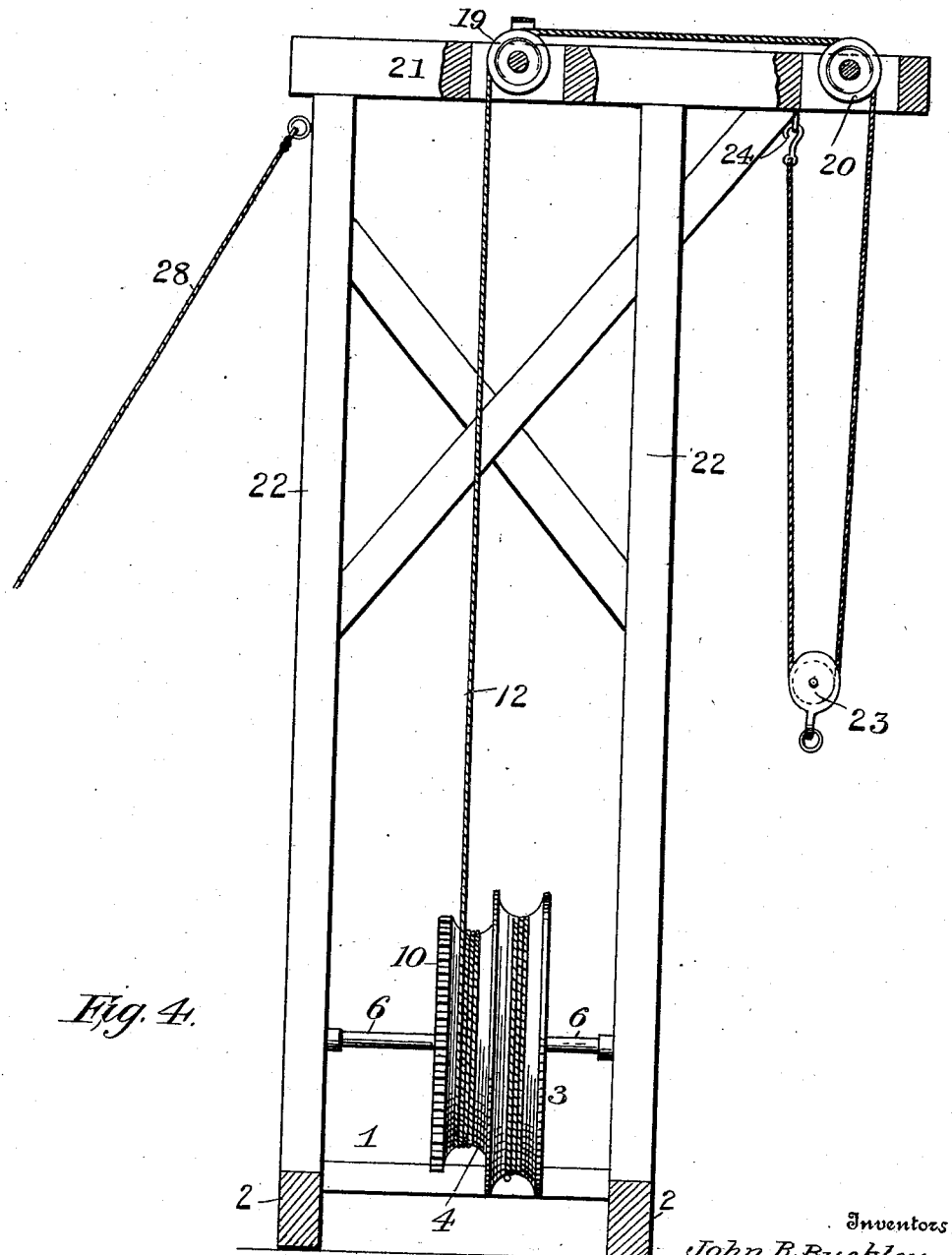

UNITED STATES PATENT OFFICE.

JOHN R. BUCKLEY AND GEORGE A. HUGGINS, OF MATTOON, WISCONSIN.

LOG-LOADING MACHINE.

No. 888,583.      Specification of Letters Patent.      Patented May 26, 1908.

Application filed March 9, 1907. Serial No. 361,557.

*To all whom it may concern:*

Be it known that we, JOHN R. BUCKLEY and GEORGE A. HUGGINS, citizens of the United States, residing at Mattoon, in the county of Shawano and State of Wisconsin, have invented certain new and useful Improvements in Log-Loading Machines, of which the following is a specification.

Our invention relates to improvements in log loading machines. Its object is to facilitate and expedite the loading operation and to provide for accomplishing the same in a simple, advantageous and effective manner.

Said invention consists of the combination and arrangement of certain instrumentalities substantially as hereinafter fully disclosed and specifically pointed out by the claims.

In the accompanying drawings illustrating the preferred embodiment of the invention— Figure 1 is a side elevation, Fig. 2 is a rear end elevation, on an enlarged scale. Fig. 3 is a plan view thereof. Fig. 4 is a vertical transverse section of the same.

In the disclosure of our invention, we suitably mount upon a frame 1, preferably equipped with runners 2 for ready transportation from point to point, a number of winding drums 3, 4, 5. The drums 3, 4 immediately adjoin each other and are carried by a common shaft or axis 6 and the drum 5 is carried by a separate shaft or axis 7, both said shafts or axes being suitably journaled in boxes or bearings 8 secured upon the frame 1. The drums 3 and 4 are driven by intergeared wheels or pinions 9, 10 secured to the drums 4 and 5.

Lines or cables 11, 12, preferably of wire, are wound upon the drums 3, 4, 5, the cable or line 11 being applied to both the drums 3 and 5 and the cable or wire 12 being applied to the drum 4, all of said lines or cables being wound upon said drums from below. The wire or cable 11, suitably guided through eye-ended bolts 14 secured to the frame 1, is looped around a pulley 15, whose block is suitably staked to the ground at a suitable distance from the machine for purposes well understood, and which wire or cable has suitably attached thereto, by a short branch-wire 16 and ring 17, the hitching whiffletree 18 for the horse or motive power. The wire or cable 12 passes upward from its winding drum, over preferably two spaced-apart pulleys 19, 20 suitably supported in elevated position in a beam 21 secured to uprights 22 fastened to the frame 1, said cable or wire being looped around a pulley 23 and having its returned end-portion suitably secured to said beam preferably as at 24. From the block of said pulley are suitably suspended by additional wires or lines 25, grappling hooks 26 for engagement with the ends of the logs, it may be desired to load into the vehicle or wagon. Guy-lines 27 are suitably connected to the grappling hooks 26, by pulling upon which, after the lifting of the engaged log into the required elevated position, as in loading the same into the wagon, said hooks may be disengaged from the log and thus be withdrawn for subsequent like use.

Suitable anchoring means, as pieces of wire-rope or cable 28 secured to the upright-frame 22, and to stakes driven into the ground, are employed for staying or bracing the machine in effective position.

It will be noted that, in operation, the grappling hooks 26 having been engaged with the log or other object for lifting or loading as aforesaid and the motive power suitably applied as previously pointed out, the drums 3, 4, 5 will all be driven permitting the unwinding of the line or cable 11 from its drum and accordingly the winding of the line 12 upon its drum, the action of the gearing 9, 10 having the effect to transmit a reverse motion to the rope-winding drum 4 and the slack-compensating drum 3 during the unwinding action of the line or cable and the winding thereof upon the drum 5 according as the motive power or horse is moving forward or is backed in effecting the operation of the machine.

The machine thus constituted is highly effective for its intended purpose, is adapted to greatly facilitate and expedite the loading operation, is simple and economic in construction, and is of relatively few parts.

We claim—

1. In a log loading machine the combination with two shafts, two drums on one shaft and one drum on the other shaft, the drums on the two shafts intergeared, a cable passed around a pulley and having its ends secured to a drum on each shaft and an independent cable secured to the third drum, of a block and tackle supported by this last mentioned cable.

2. In a log loading machine the combination with two shafts, two drums on one shaft and one drum on the other shaft, the drums on the two shafts intergeared, a cable passed around a pulley and having its ends secured to a drum on each shaft and an independent cable secured to the third drum, of a block and tackle supported by this last mentioned cable and grappling hooks and cables supported thereby.

3. A machine as described, comprising a series of three drums, two being carried upon a common shaft and both of these drums having a single cable or rope, and a second line or cable engaging the third drum, means for the otherwise effective application of said cables or lines for use, and intergearing pinions for imparting reverse motion from the single drum to the other two drums.

In testimony whereof we affix our signatures, in presence of two witnesses.

JOHN R. BUCKLEY.
GEORGE A. HUGGINS.

Witnesses as to the signature of John R. Buckley:
ALBERT S. LARSON,
MABEL LA MONTAGUE.

Witnesses as to the signature of George A. Huggins:
ELMER A. MORSE,
T. P. TRADEWELL.